United States Patent
Mochizuki (10) Patent No.: US 10,442,639 B2
(45) Date of Patent: Oct. 15, 2019

(54) SEPARATOR SUCTION DEVICE WITH ROTARY ACTUATOR

(71) Applicant: TOYOTA JIDOSHA KABUSHIKI KAISHA, Toyota-shi, Aichi (JP)

(72) Inventor: Michihisa Mochizuki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/275,482

(22) Filed: Feb. 14, 2019

(65) Prior Publication Data

US 2019/0248603 A1     Aug. 15, 2019

(30) Foreign Application Priority Data

Feb. 15, 2018  (JP) ................. 2018-024653

(51) Int. Cl.
| | | |
|---|---|---|
| B25J 15/06 | (2006.01) | |
| B65G 59/04 | (2006.01) | |
| B21D 1/06 | (2006.01) | |
| B65H 9/08 | (2006.01) | |
| B65H 5/08 | (2006.01) | |
| B65H 5/14 | (2006.01) | |

(52) U.S. Cl.
CPC ............ *B65G 59/04* (2013.01); *B21D 1/06* (2013.01); *B25J 15/0616* (2013.01); *B65H 5/08* (2013.01); *B65H 5/14* (2013.01); *B65H 9/08* (2013.01); *B65G 2201/022* (2013.01)

(58) Field of Classification Search
CPC .............. B65G 59/04; B65G 2201/022; B25J 15/0616; B65H 5/08; B65H 5/10; B65H 5/14; B65H 5/222; B65H 9/08; B65H 29/241; B65H 29/32

See application file for complete search history.

(56) References Cited

U.S. PATENT DOCUMENTS

| | | | | |
|---|---|---|---|---|
| 2,941,799 A | * | 6/1960 | Reincke ............... | B65H 3/46 271/92 |
| 3,168,204 A | * | 2/1965 | Voulliaire ............. | B65B 25/046 414/791.7 |
| 4,905,456 A | * | 3/1990 | Olaechea ............. | B65B 5/105 294/65 |

(Continued)

FOREIGN PATENT DOCUMENTS

| | | |
|---|---|---|
| JP | 2009-205919 A | 9/2009 |
| JP | 2014-123501 A | 7/2014 |

*Primary Examiner* — Gerald McClain
(74) *Attorney, Agent, or Firm* — Sughrue Mion, PLLC (57) ABSTRACT

A separator suction device that corrects warpage without damaging stacked separators is provided. The separator suction device is capable of suctioning and conveying a separator stored in a state where a plurality of the separators are stacked. The separator suction device includes a first arm that includes a first suction portion capable of suctioning the separator by a negative pressure, a second arm that includes a second suction portion capable of suctioning the separator by a negative pressure, and a turning mechanism that moves the first arm and the second arm to selectively arrange the first arm and the second arm at any one of a follow-up position to follow a warped shape of the separator or a correction position to correct the warpage of the separator.

4 Claims, 8 Drawing Sheets

(56) References Cited

U.S. PATENT DOCUMENTS

| | | | | |
|---|---|---|---|---|
| 5,079,903 A | * | 1/1992 | Hakansson | B65B 35/38 |
| | | | | 294/65 |
| 5,433,426 A | * | 7/1995 | Bond | B65H 3/0816 |
| | | | | 271/104 |
| 2008/0300123 A1 | * | 12/2008 | Bonnain | B65B 43/265 |
| | | | | 493/310 |

* cited by examiner

SEPARATOR SUCTION DEVICE WITH ROTARY ACTUATOR

CROSS REFERENCE TO RELATED APPLICATIONS

The present application claims priority from Japanese patent application JP 2018-024653 filed on Feb. 15, 2018, the content of which is hereby incorporated by reference into this application.

BACKGROUND

Technical Field

The present disclosure relates to a separator suction device that suctions a separator stored in a state where a plurality of the separators are stacked.

Background Art

This type of separator is made by press forming a metal plate material, and a punching work and a bending work in the press forming cause warpage on a separator. There is disclosed a press device that corrects such warpage of the separator (see JP 2009-205919 A). This press device includes an upper die having a first movable mold and a second movable mold, a lower die, a guiding member that extends from the lower die toward the upper die, and an adjusting unit that adjusts movement of the second movable mold in the direction parallel to a placement surface for placing the separators. The separators with the warpage are placed on the placement surface of the lower die, and are sequentially stacked on the lower die toward the upper die. The stacked separators are configured so as to be pressed by collaborating operations of the upper die and the lower die such that the warpage is corrected.

Figure 5A:
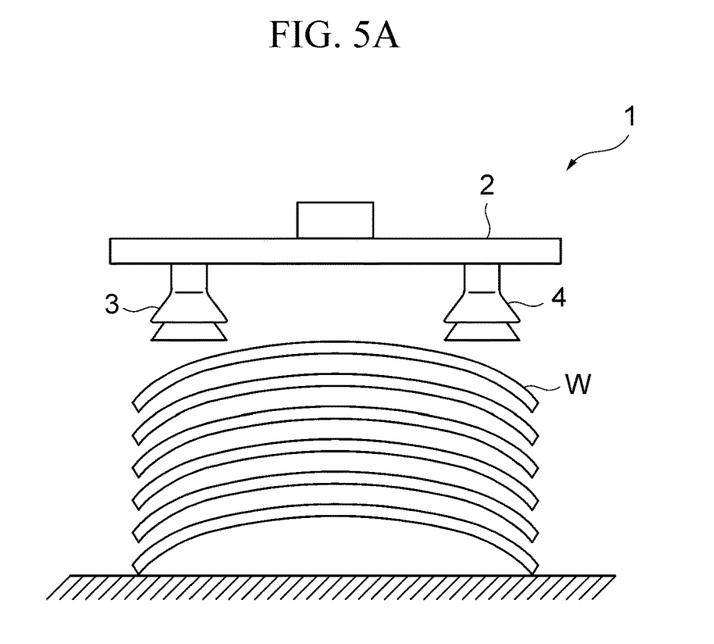
Figure 5B:
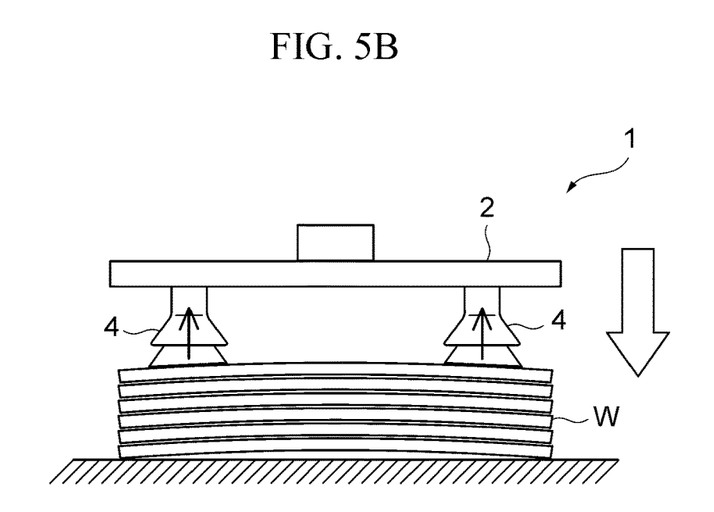

As illustrated in FIG. 5A and FIG. 5B, there is also a separator suction device 1 that suctions the separator to correct the warpage. This separator suction device 1 includes a main body 2, suction hands 3 and 4 secured to the main body 2, a negative pressure supply unit (not illustrated), and an elevating mechanism unit (not illustrated). In the separator suction device 1, the elevating mechanism unit moves the main body 2 and the suction hands 3 and 4 down to stacked separators W from the home position. When the suction hands 3 and 4 reach the separator W that is stacked uppermost, the negative pressure supply unit supplies negative pressures acting in the arrow directions. The negative pressures suction the separator, and thus, the separator is held by the suction hands 3 and 4. In a state where the separator W is held by the suction hands 3 and 4, the elevating mechanism unit further moves the main body 2 and the suction hands 3 and 4 down, and thus, a pressure is applied to the stacked separators W. This pressure application corrects the warpage of the separators W.

SUMMARY

However, in the press device disclosed in JP 2009-205919 A, the upper die and the lower die apply the pressure on the stacked separators to correct warpage. Therefore, there lies a problem that the surfaces of the separators are possibly damaged due to the friction between the separators adjacent in the stacking direction when the pressure is applied on the separators. Also in the separator suction device 1, the pressure is applied to the separators in the stacking direction while the separators are suctioned. Therefore, the separator suction device 1 also has a problem that the surfaces of the separators are possibly damaged due to the friction between the separators similarly to the press device disclosed in JP 2009-205919 A.

The present disclosure has been made to solve such problems, and provides a separator suction device that corrects warpage without damaging stacked separators.

(1) A separator suction device according to the present disclosure is a suction device capable of suctioning and conveying a separator stored in a state where a plurality of the separators are stacked. The separator suction device includes a first arm, a second arm, and a transporting unit. The first arm includes a first suction portion capable of suctioning the separator by a negative pressure. The second arm is disposed to form a pair with the first arm. The second arm includes a second suction portion capable of suctioning the separator by a negative pressure. The transporting unit moves the first arm and the second arm to selectively arrange the first arm and the second arm at any one of a follow-up position to follow a warped shape of the separator or a correction position to correct the warpage of the separator.

(2) The separator suction device according to the present disclosure is the separator suction device according to (1) where the transporting unit has a configuration in which the first arm and the second arm are moved from the follow-up position to the correction position when the negative pressures of the first suction portion and the second suction portion become equal to or more than a preliminarily set threshold value.

(3) The separator suction device according to the present disclosure is the separator suction device according to (1) or (2) where the transporting unit includes a drive unit and a control unit. The drive unit moves the first arm and the second arm. The control unit controls the drive unit.

(4) The separator suction device according to the present disclosure is the separator suction device according to (1) or (2) where the transporting unit includes a supporting portion and a pneumatic piston. The supporting portion turnably supports the first arm and the second arm. The pneumatic piston turns the first arm and the second arm by extending and contracting corresponding to the negative pressures.

(5) The separator suction device according to the present disclosure is the separator suction device according to (4) where the separator suction device has a configuration in which the pneumatic piston is supplied with the negative pressures supplied to the first suction portion and the second suction portion, and the pneumatic piston contracts to move the first arm and the second arm from the follow-up position to the correction position when the negative pressures of the first suction portion and the second suction portion become equal to or more than a preliminarily set threshold value.

(6) The separator suction device according to the present disclosure is the separator suction device according to any one of (1) to (5) where the first suction portion and the second suction portion suction inner portions inwardly separated from an outer periphery of the separator by a predetermined distance.

(1) The separator suction device according to the present disclosure includes the first arm that includes the first suction portion capable of suctioning the separator by the negative pressure, the second arm that is disposed to form a pair with the first arm, and includes the second suction portion capable of suctioning the separator by the negative pressure, and the transporting unit that moves the first arm and the second arm to selectively arrange the first arm and the second arm at any one of the follow-up position to follow the warped shape of the separator or the correction position to correct the warpage of the separator.

This configuration ensures moving the first arm and the second arm to cause the first suction portion and the second suction portion to suction the separator with warpage at the follow-up position to follow the warped shape. After the separator is suctioned, the first arm and the second arm are moved to the correction position to correct the warpage of the separator, and thus, the warpage of the separator can be corrected. Accordingly, no influence is given on another separator, and thus, an occurrence of damage on the other separator is reduced.

(2) The separator suction device according to the present disclosure has a configuration in which the first arm and the second arm are moved from the follow-up position to the correction position when the negative pressures of the first suction portion and the second suction portion become equal to or more than the preliminarily set threshold value.

This configuration moves the first arm and the second arm from the follow-up position to the correction position corresponding to a suction timing of the first suction portion and the second suction portion, thereby reducing what is called a cycle time, which is a processing time per one separator.

(3) The separator suction device according to the present disclosure may include the transporting unit that includes the drive unit that moves the first arm and the second arm, and the control unit that controls the drive unit. Accordingly, the first arm and the second arm can be moved from the follow-up position to the correction position corresponding to the suction timing of the first suction portion and the second suction portion by controlling the drive unit with the control unit.

(4) The separator suction device according to the present disclosure may include the transporting unit that includes the supporting portion that turnably supports the first arm and the second arm, and the pneumatic piston that turns the first arm and the second arm by extending and contracting corresponding to the negative pressures. Accordingly, the first arm and the second arm turnably supported by a supporting portion can be turned by the extending and contracting of the pneumatic piston corresponding to the negative pressures, and moved from the follow-up position to the correction position.

(5) The separator suction device according to the present disclosure may have a configuration in which the pneumatic piston is supplied with the negative pressures supplied to the first suction portion and the second suction portion, and the pneumatic piston contracts to move the first arm and the second arm from the follow-up position to the correction position when the negative pressures of the first suction portion and the second suction portion become equal to or more than the preliminarily set threshold value. Because of the mechanical mechanism as the pneumatic piston, a sensor to detect suction pressures of the first suction portion and the second suction portion to the separator is no longer necessary, and thus, a circuit for control is simplified to ensure achieving a low cost.

(6) In the separator suction device according to the present disclosure, the first suction portion and the second suction portion are configured to suction the inner portions inwardly separated from the outer periphery of the separator by the predetermined distance. With this configuration, the separator suctioned by the first suction portion and the second suction portion can be chucked within a range of the predetermined distance inward from the outer periphery. As a result, a conveying unit such as a conveying device including a chuck mechanism can convey the separator.

The present disclosure can provide the separator suction device that corrects warpage without damaging the stacked separators.

Further features related to the present disclosure are clarified from the description of the present description and the accompanying drawings. Problems, configurations, and effects other than ones described above will be clarified in the following explanation of embodiments.

BRIEF DESCRIPTION OF THE DRAWINGS

FIGS. 1A, 1B, and 1C are front views of a separator suction device according to an embodiment of the disclosure, FIG. 1A illustrates a state where a first arm and a second arm of the separator suction device are not turned, FIG. 1B illustrates a state where each of the first arm and the second arm of the separator suction device is turned, and FIG. 1C illustrates a state where each of the first arm and the second arm of the separator suction device is turned in the opposite direction of the direction illustrated in FIG. 1B;

FIGS. 2A, 2B, 2C, and 2D are front views of the separator suction device according to the embodiment of the disclosure, FIG. 2A illustrates a state where the first arm and the second arm of the separator suction device are not turned, FIG. 2B illustrates a state where each of the first arm and the second arm of the separator suction device is turned to correspond the shape of the separator, and FIG. 2C illustrates a state where each of a first suction portion and a second suction portion of the separator suction device suctions the separator, and FIG. 2D illustrates a state where each of the first suction portion and the second suction portion of the separator suction device corrects the separator;

FIGS. 4A, 4B, and 4C are front views of a separator suction device according to another embodiment of the disclosure, FIG. 4A illustrates a state where a first arm and a second arm of the separator suction device are not turned, FIG. 4B illustrates a state where each of the first arm and the second arm of the separator suction device is turned, FIG. 4C illustrates a state where each of the first arm and the second arm of the separator suction device is turned in the opposite direction of the direction illustrated in FIG. 4B; and FIGS. 5A and 5B are front views of a conventional separator suction device, FIG. 5A illustrates a state before a separator is suctioned, and FIG. 5B illustrates a state where the separator is suctioned and pressurized.

DETAILED DESCRIPTION

A description will be given of a separator suction device 10 according to an embodiment to which the separator suction device according to the present disclosure is applied with reference to the drawings.

Figure 1A:
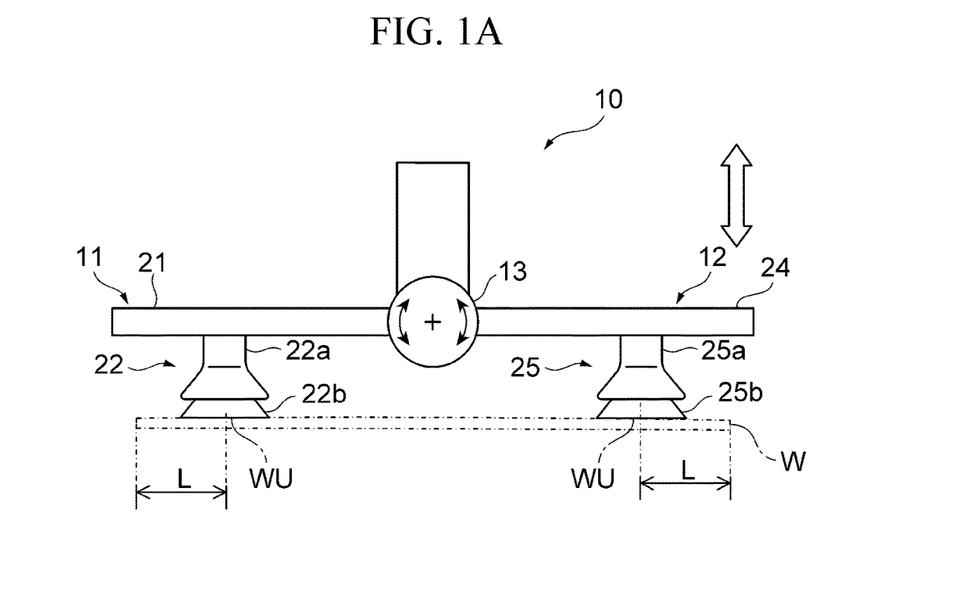
Figure 1B:
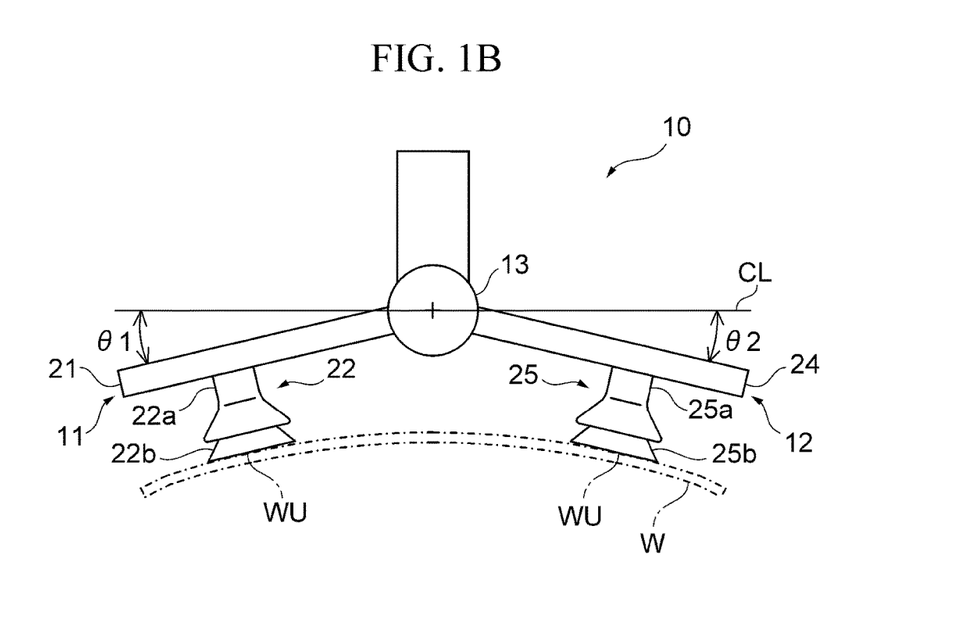
Figure 1C:
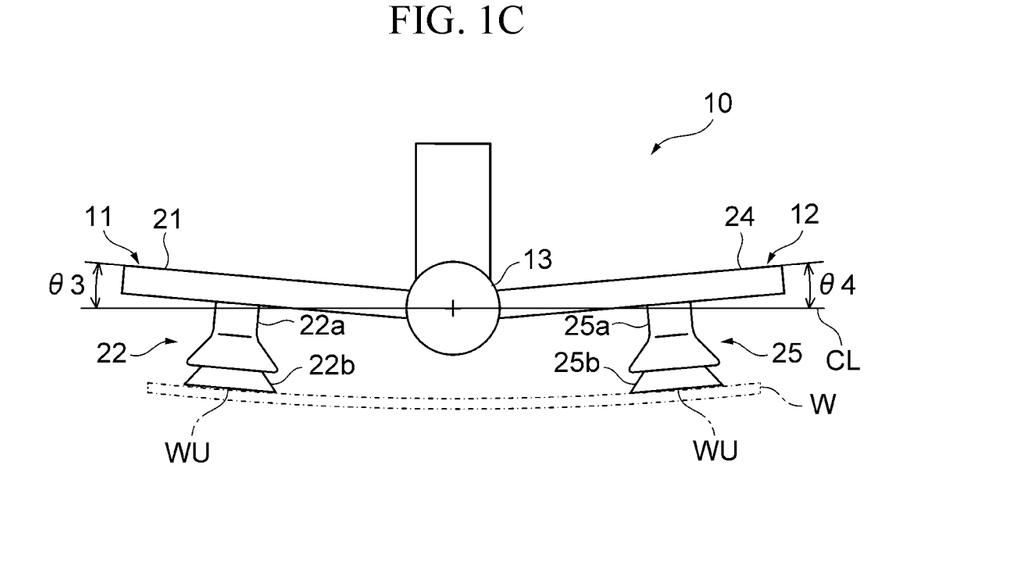

As illustrated in FIG. 1A, FIG. 1B, and FIG. 1C, the separator suction device 10 includes a first arm 11, a second arm 12, a turning mechanism 13, a negative pressure supply device, an elevating device, and a control device. The negative pressure supply device, the elevating device, and the control device are not illustrated. The separator suction device 10 is configured to correct warpage of a separator W that constitutes a single cell for a fuel cell so as to ensure obtaining the separator W in a set shape.

The separator W includes a metal plate such as a steel plate, a stainless steel plate, and an aluminum plate, and made by press forming. The separator W is configured such that a surface treatment of, for example, a titanium (Ti) thin film and a carbon layer (C) is applied on the surface. The separator W includes an anode side separator and a cathode side separator. The anode side separator is joined on an anode side gas diffusion layer that constitutes a membrane electrode gas diffusion layer assembly of a single cell for a fuel cell, and includes a fuel gas flow passage through which hydrogen as a fuel gas passes. The cathode side separator is joined on a cathode side gas diffusion layer, and includes an oxidant gas flow passage through which air as an oxidant gas passes.

The first arm 11 includes an arm main body 21 and a first suction portion 22. The arm main body 21 has a configuration in which the arm main body 21 can be selectively arranged at any one of a follow-up position to follow a warped shape of the separator W as illustrated in FIG. 1B or a correction position to correct the warpage of the separator W as illustrated in FIG. 1A.

The arm main body 21 is turnably coupled to the turning mechanism 13 at its base portion. As illustrated in FIG. 1B, the arm main body 21 is supported so as to turn within an angle range of $\theta 1$ (degrees) in the counterclockwise direction with respect to the center line CL passing through a turning center of the turning mechanism 13. The turning mechanism 13 includes a stopper such that the angle of the arm main body 21 does not exceed the angle range of $\theta 1$ (degrees), and supports the arm main body 21 such that the arm main body 21 can freely turn within the angle range of $\theta 1$ (degrees) (supporting portion).

The arm main body 21 is configured to correct warpage of the separator W at the horizontal position as illustrated in FIG. 1A.

However, it is conceivable that, depending on a structure such as a size, a material, a shape, and the like, of the separator W, there may be a separator W that has an occurrence of what is called a springback, which is a phenomenon that causes the separator W to return to its original form when a metal plate is bent through a press work and the like. In this case, as illustrated in FIG. 1C, warpage of the separator W may be corrected by turning the arm main body 21 within the angle range of $\theta 3$ (degrees) from the center line CL in the opposite direction of the direction of the warpage of the separator W so as to arrange the arm main body 21 at the correction position.

The first suction portion 22 is a suction hand formed of a flexible material such as nitrile rubber with high wear resistance, tear resistance, and oil resistance. The first suction portion 22 includes a mounting portion 22a attached to the arm main body 21 and a vacuum pad portion 22b that suctions the separator W.

The mounting portion 22a is attached to a distal end portion positioned at the opposite side of the base portion coupled to the turning mechanism 13 of the arm main body 21 or a position separated from the base portion toward the distal end portion. The vacuum pad portion 22b suctions an inner portion WU that is inwardly separated from the outer periphery of the separator W by the predetermined distance L.

The vacuum pad portion 22b is configured to follow the unevenness on the surface of the separator W, and be in a close contact with the separator W by a supplied negative pressure (−kPa).

The first suction portion 22 is coupled to the negative pressure supply device via a first negative pressure supply pipe (not illustrated). The negative pressure is supplied to the vacuum pad portion 22b of the first suction portion 22 from the negative pressure supply device.

The second arm 12 includes an arm main body 24 and a second suction portion 25. The arm main body 24 has a configuration in which the arm main body 24 can be selectively arranged at any one of a follow-up position to follow a warped shape of the separator W as illustrated in FIG. 1B or a correction position to correct the warpage of the separator W as illustrated in FIG. 1A, similarly to the arm main body 21.

The arm main body 24 is turnably coupled to the turning mechanism 13 at the base portion similarly to the arm main body 21. As illustrated in FIG. 1B, the arm main body 24 is supported so as to turn within an angle range of $\theta 2$ (degrees) in the clockwise direction with respect to the center line CL passing through the turning center of the turning mechanism 13. The turning mechanism 13 includes a stopper such that the angle of the arm main body 24 does not exceed the angle range of $\theta 2$ (degrees), and supports the arm main body 24 such that the arm main body 24 can freely turn within the angle range of $\theta 2$ (degrees) (supporting portion).

As illustrated in FIG. 1A, the arm main body 24 is configured to correct warpage of the separator W at the horizontal position, similarly to the arm main body 21.

The arm main body 24 may correct warpage of the separator W by turning the arm main body 24 within the angle range of $\theta 4$ (degrees) from the center line CL in the opposite direction of the direction of the warpage of the separator W so as to arrange the arm main body 24 at the correction position as illustrated in FIG. 1C, considering that there may be a separator W that has an occurrence of a springback, similarly to the arm main body 21.

The second suction portion 25 is a suction hand formed of a flexible material such as nitrile rubber with high wear resistance, tear resistance, and oil resistance, similarly to the first suction portion 22. The second suction portion 25 includes a mounting portion 25a attached to the arm main body 24 and a vacuum pad portion 25b that suctions the separator W.

The mounting portion 25a is attached to a distal end portion positioned at the opposite side of the base portion coupled to the turning mechanism 13 of the arm main body 24 or a position separated from the base portion toward the distal end portion. The vacuum pad portion 25b suctions an inner portion WU that is inwardly separated from the outer periphery of the separator W by the predetermined distance L.

The vacuum pad portion 25b is configured to follow the unevenness on the surface of the separator W, and be in a close contact with the separator W by a supplied negative pressure (−kPa).

The second suction portion 25 is coupled to the negative pressure supply device via a second negative pressure supply pipe (not illustrated), similarly to the first suction portion 22. The negative pressure is supplied to the vacuum pad portion 25b of the second suction portion 25 from the negative pressure supply device.

The angle ranges of $\theta 1$, $\theta 2$, $\theta 3$, and $\theta 4$, and the distance L are appropriately selected based on data of, for example, setting specifications such as a size, a shape, and a structure of the separator suction device 10 and the separator W and experimental values.

The turning mechanism 13 configures a transporting unit that moves the first arm 11 and the second arm 12 so as to selectively arrange the separator W at any one of the follow-up position or the correction position. The turning mechanism 13 includes a drive unit such as a rotary actuator and has a configuration that turns the arm main body 21 of the first arm 11 and the arm main body 24 of the second arm 12, which are coupled, at a predetermined torque (Nm) and stops at the predetermined turning angle (degrees). The turning mechanism 13 is electrically coupled to the control device, and is configured such that its operation is controlled.

The negative pressure supply device includes a vacuum pump and a pump motor that drives this vacuum pump so as to have a structure to generate the negative pressure. The negative pressure supply device is coupled to the first negative pressure supply pipe and the second negative pressure supply pipe, and the generated negative pressure is supplied to the first suction portion 22 and the second suction portion 25 via the first negative pressure supply pipe and the second negative pressure supply pipe.

The negative pressure supply device is configured so as to be controlled by the control device. The negative pressure supply device has a function to detect the negative pressures supplied to the first suction portion 22 and the second suction portion 25. The detected negative pressures are configured so as to be transmitted to the control device.

The elevating device includes a drive mechanism driven by a hydraulic pressure generated by an electric motor and a hydraulic pump, and is configured to move up and down in the arrow direction illustrated in FIG. 1A. The elevating device is electrically coupled to the control device, and is configured such that its operation is controlled.

The control device is configured of a microcomputer including a central processing unit and a storage device. The control device is electrically coupled to the turning mechanism 13, the negative pressure supply device, and the elevating device. The control device is configured to control the operations of the respective components of the separator suction device 10. The control device starts the turning operations of the arm main bodies 21 and 24 by the turning mechanism 13, and controls to correct warpage of the separator W on condition that the negative pressures of the first suction portion 22 and the second suction portion 25 become equal to or more than a preliminarily set threshold value by receiving a signal indicative of the negative pressures transmitted from the negative pressure supply device.

Next, a description will be given of an operation of the separator suction device 10 according to the embodiment with reference to the drawings.

Figure 2A:
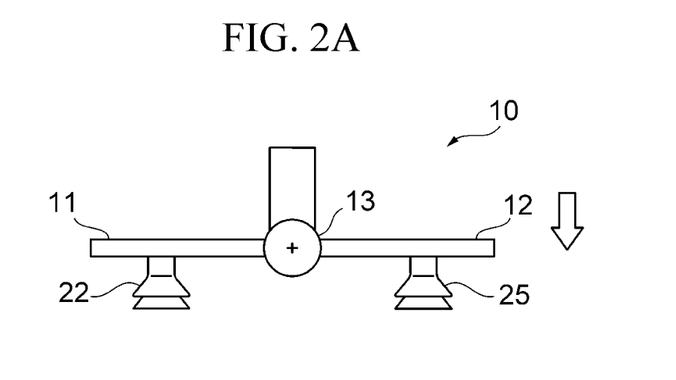
Figure 2B:
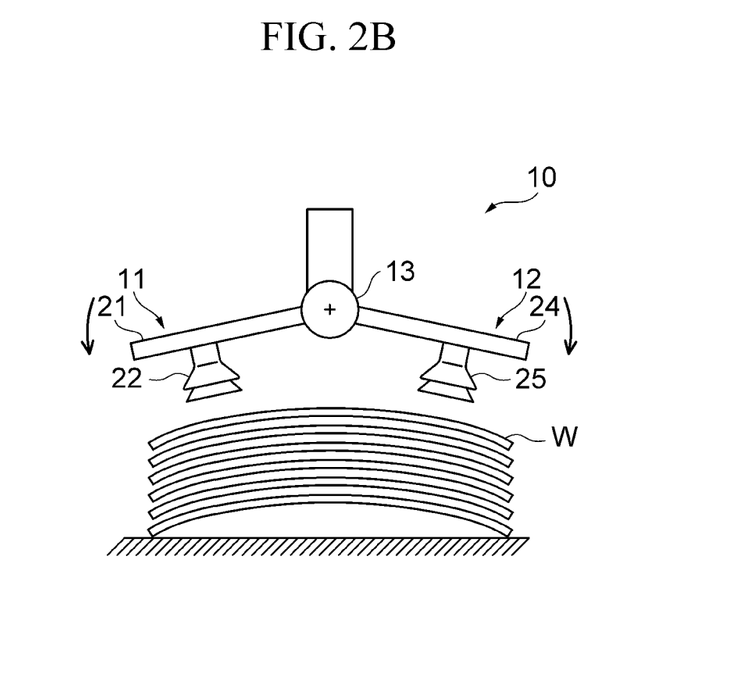

First, an operation of the elevating device of the separator suction device 10 starts, and the separator suction device 10 moves down in the arrow direction illustrated in FIG. 2A toward the separator W stacked uppermost of the separators W stored in a state where a plurality of the separators W are stacked. Subsequently, the first arm 11 and the second arm 12 of the separator suction device 10 are turned by the turning mechanism 13 so as to achieve an angle preliminarily set to correspond to the warpage of the separator W as illustrated in FIG. 2B (follow-up position). This turning is performed during the separator suction device 10 moving down so as to shorten the operating time. The turning of the first arm 11 and the second arm 12 may be performed before the separator suction device 10 moving down or after the separator suction device 10 moving down.

Figure 2C:
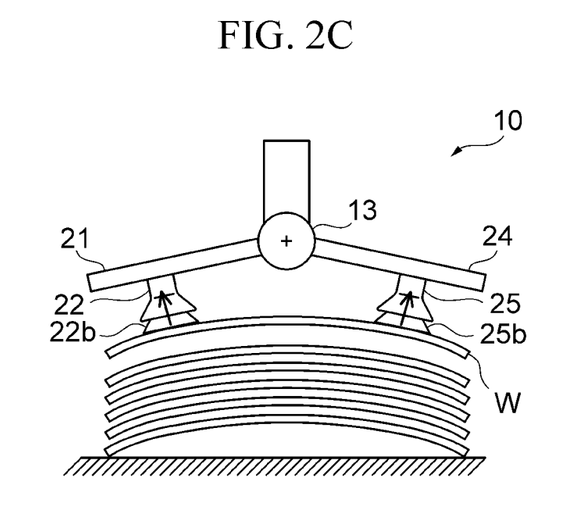

When the separator suction device 10 moves down to a preliminarily set descended position, and the first suction portion 22 and the second suction portion 25 contact the separator W, the negative pressure supply device operates to supply the respective negative pressures to the first suction portion 22 and the second suction portion 25 via the first negative pressure supply pipe and the second negative pressure supply pipe. Next, as illustrated in FIG. 2C, the suctions by the vacuum pad portion 22b of the first suction portion 22 and the vacuum pad portion 25b of the second suction portion 25 start.

When the vacuum pad portion 22b and the vacuum pad portion 25b suction the separator W, the negative pressures supplied by the negative pressure supply device increase, and the negative pressures become equal to or more than the preliminarily set threshold value. This signal is transmitted to the control device.

Figure 2D:
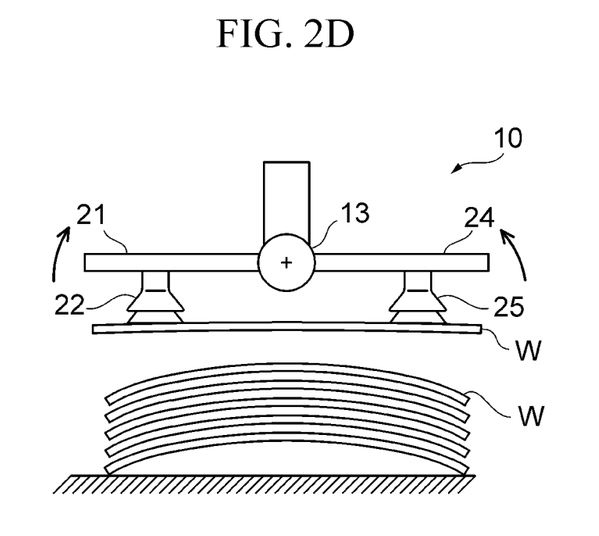

The control device turns the first arm 11 and the second arm 12 to the horizontal position (correction position) by controlling the turning mechanism 13 when the signal indicative of the negative pressures having increased up to the threshold value or more is received from the negative pressure supply device. This turning corrects the separator W with warpage into a flat shape. That is, the separator is suctioned by the first suction portion 22 and the second suction portion 25 in a state with the warpage, and is corrected to a shape without the warpage from the warped shape by the turning of the first arm 11 and the second arm 12. Subsequently, the separator suction device 10 is moved up to an original position by the elevating device, and the corrected separator W is conveyed to a predetermined position for, for example, a subsequent process, by a conveying device (not illustrated).

After the conveyance by the conveying device is terminated, the separator suction device 10 is moved down in the arrow direction illustrated in FIG. 2A again by the elevating device toward the separator W stacked subsequent to the uppermost separator W stored in the state where the plurality of separator W are stacked. The correction of the separator W with warpage is similarly repeated subsequently. The correction of the separator W by the separator suction device 10 is terminated when the separator W stacked last is corrected.

Figure 3:
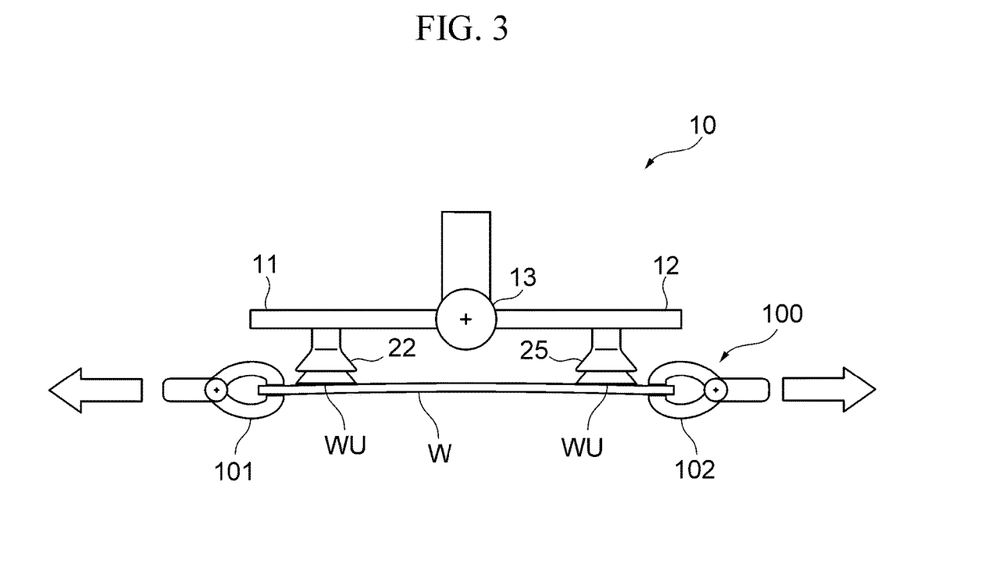
FIG. 3 is a front view of the separator suction device according to the embodiment of the disclosure, and illustrates a state where the separator is grasped by chucks.

The conveyance of the separator W may be performed by a conveying device 100 including a chuck mechanism as illustrated in FIG. 3. This conveying device 100 includes a chuck 101 that grasps one end portion of an outer periphery of the separator W, a chuck 102 that grasps the other end portion of the outer periphery of the separator W, a conveying unit (not illustrated), and a control unit (not illustrated).

The conveying device 100 is configured to convey the separator W at a high speed, while grasping the one end portion and the other end portion of the corrected separator W, pulling the separator W in opposite directions from one another indicated by the arrows in FIG. 3, to further correct the warpage of the separator W.

The following describes effects of the separator suction device 10 according to the embodiment.

The separator suction device 10 according to the embodiment includes the first arm 11 including the first suction portion 22 capable of suctioning the separator W by the negative pressure, the second arm 12 disposed to form a pair with the first arm 11 and including the second suction portion 25 capable of suctioning the separator W by the negative pressure, and the turning mechanism 13 that moves the first arm 11 and the second arm 12 to selectively arrange the first arm 11 and the second arm 12 at any one of the follow-up position to follow the warped shape of the separator W or the correction position to correct the warpage of the separator W.

This configuration moves the first arm 11 and the second arm 12 to suction the separator W with warpage by the first suction portion 22 and the second suction portion 25 at the follow-up position to follow the warped shape. After the separator W is suctioned, the first arm 11 and the second arm 12 are moved to the correction position to correct the warpage of the separator W by the turning mechanism 13, and thus, the warpage of the separator W is corrected. Even when the separators W are stacked, the warpage of the separator W is independently corrected. Therefore, no influence is given on another separator W, thereby obtaining an effect of reduced occurrence of damage on the other separator W.

Conventionally in a press device that houses stacked separators in a guiding member, and collectively presses the separators to correct warpage, and in a suction device that houses the separators in a base and a suction frame body disposed at the base and suctions the separators to correct warpage, there has been a problem that it is difficult to take out the corrected separators one by one due to the guiding member of the press device or the suction frame body of the suction device becoming an obstacle when the separators are taken out. In contrast to this, the separator suction device 10 according to this embodiment ensures independently correcting warpage of the separator W; therefore, there is no problem of a difficulty in taking out the corrected separators one by one.

In the separator suction device 10 according to the embodiment, the first suction portion 22 and the second suction portion 25 are coupled to the negative pressure supply device, and the separator W is suctioned by the negative pressures supplied from the negative pressure supply device. The first arm 11 and the second arm 12 are configured to move from the follow-up position to follow the warped shape of the separator W to the correction position to correct the warpage of the separator W when the negative pressures become equal to or more than the preliminarily set threshold value.

This configuration moves the first arm 11 and the second arm 12 from the follow-up position to the correction position corresponding to a suction timing of the first suction portion 22 and the second suction portion 25, thereby ensuring the reduced, what is called, cycle time, which is a processing time per one separator W.

In the separator suction device 10 according to the embodiment, the turning mechanism 13 includes a drive unit that moves the first arm 11 and the second arm 12 and the control unit that controls the drive unit. Accordingly, the control unit controls the drive unit to ensure moving the first arm 11 and the second arm 12 from the follow-up position to the correction position corresponding to the suction timing of the first suction portion 22 and the second suction portion 25.

In the separator suction device 10 according to the embodiment, the first suction portion 22 and the second suction portion 25 are configured to suction the inner portions WU of the outer periphery of the separator W. With this configuration, the separator W suctioned by the first suction portion 22 and the second suction portion 25 can be chucked at both end portions. As a result, an effect that ensures conveying the separator W using a conveying unit such as the conveying device 100 including the chuck mechanism can be obtained.

Figure 4A:
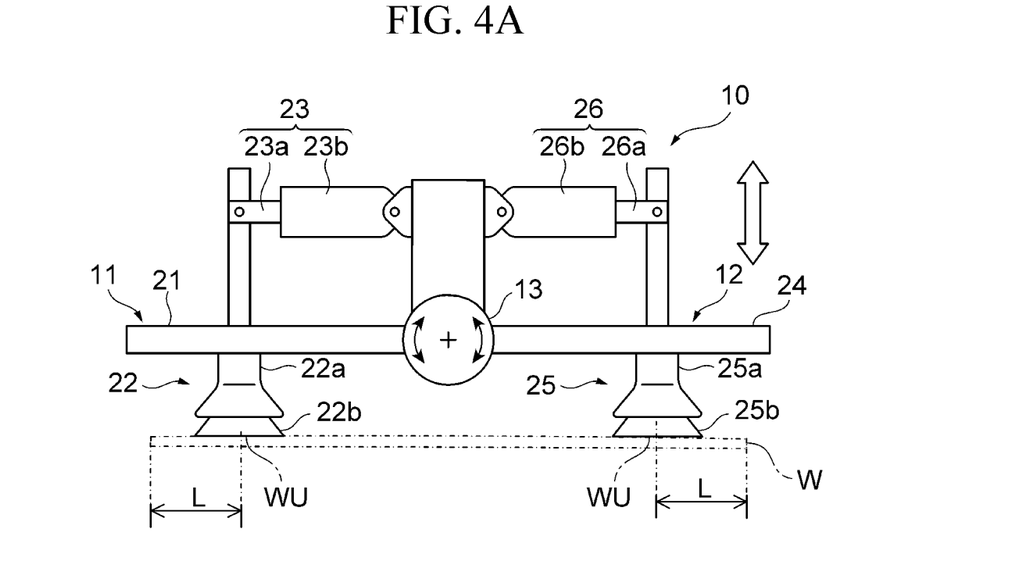
Figure 4B:
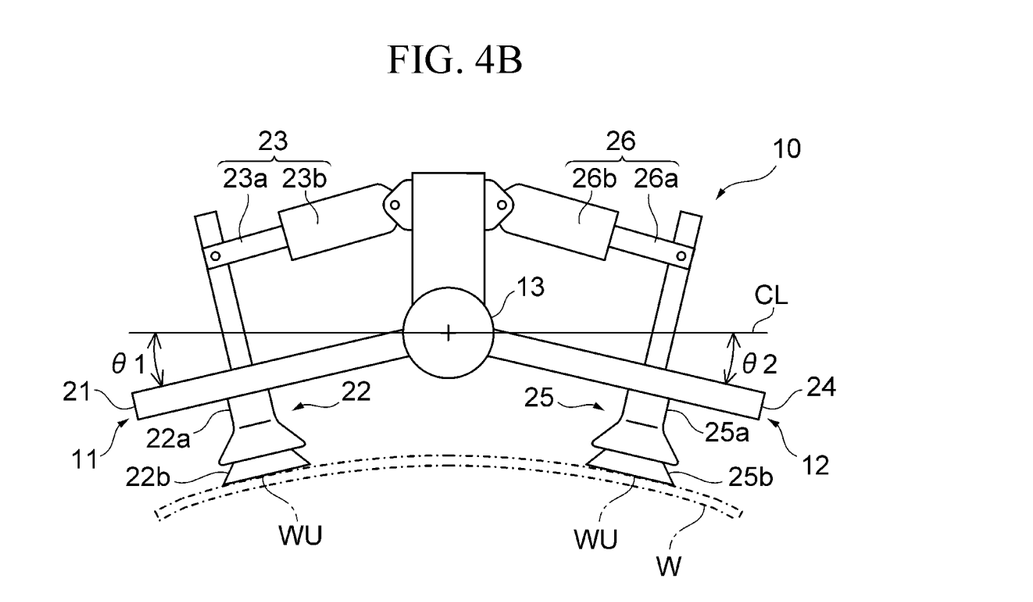
Figure 4C:
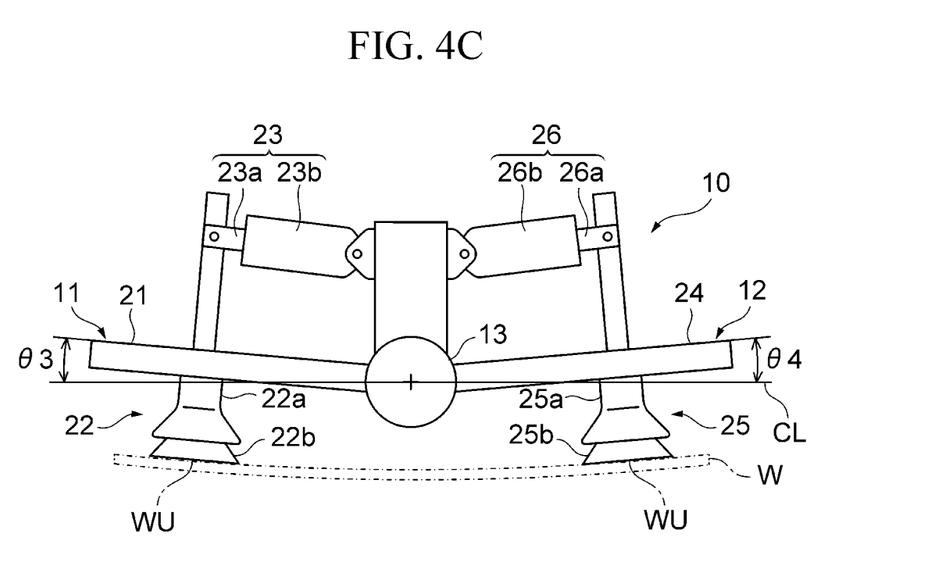

As another embodiment, for example, pneumatic cylinders 23 and 26 may be used instead of a rotary actuator as a drive unit of transporting unit as illustrated in FIGS. 4A, 4B, and 4C.

The transporting unit illustrated in FIGS. 4A, 4B, and 4C includes the turning mechanism (supporting portion) 13a that turnably supports the first arm 11 and the second arm 12 and the pneumatic cylinders 23 and 26 that turn the first arm 11 and the second arm 12 by extending and contracting corresponding to the negative pressures. The pneumatic cylinders 23 and 26 are configured to move pistons 23a and 26a by the negative pressures supplied by the cylinders 23b and 26b to turn the arm main body 21 of the first arm 11 and the arm main body 24 of the second arm 12, and stop the turning at a predetermined turning angle.

It can be configured that cylinders 23b and 26b of the pneumatic cylinders 23 and 26 are coupled to a first negative pressure supply pipe and a second negative pressure supply pipe, which are not illustrated, and when the negative pressures supplied to the cylinders 23b and 26b become equal to or more than a preliminarily set threshold value, the pistons 23a and 26a are moved so as to move the first arm 11 and the second arm 12 from the follow-up position to the correction position.

With such a configuration, it is possible to achieve a mechanical mechanism with which the first arm 11 and the second arm 12 automatically operate when the negative pressures supplied from the negative pressure supply device become equal to or more than the preliminarily set threshold value. Accordingly, it is needless to detect suction pressures of the first suction portion 22 and the second suction portion 25 to the separator W, thus eliminating the need for a sensor to directly detect the suction pressures. Therefore, a control circuit can be simplified, and a machine cycle can be reduced.

While the embodiments of the present disclosure have been described in detail above, the present disclosure is not limited thereto, and can be subjected to various kinds of changes in design without departing from the spirit and scope of the present disclosure described in the claims.

DESCRIPTION OF SYMBOLS

10 Separator suction device
11 First arm
12 Second arm
13 Turning mechanism
21, 24 Arm main body
22 First suction portion
22a, 25a Mounting portion
22b, 25b Vacuum pad portion
23, 26 Pneumatic cylinder
25 Second suction portion
100 Conveying device
101, 102 Chuck
W Separator
WU Inner portion

What is claimed is:

1. A separator suction device capable of suctioning and conveying a separator stored in a state where a plurality of the separators are stacked, the separator suction device comprising:
   a first arm that includes a first suction portion capable of suctioning the separator by a negative pressure;
   a second arm disposed to form a pair with the first arm, rotating around a shared rotational axis, the second arm including a second suction portion capable of suctioning the separator by a negative pressure; and
   a transporting unit that moves the first arm and the second arm to selectively arrange the first arm and the second arm at any one of a follow-up position to follow a warped shape of the separator or a correction position to correct the warpage of the separator
   wherein the transporting unit includes a drive unit that moves the first arm and the second arm;

wherein the drive unit includes a rotary actuator that rotates the first arm and the second arm around the shared rotational axis.

2. The separator suction device according to claim 1, wherein the transporting unit has a configuration in which the first arm and the second arm are moved from the follow-up position to the correction position when the negative pressures of the first suction portion and the second suction portion become equal to or more than a preliminarily set threshold value.

3. The separator suction device according to claim 1, wherein the transporting unit further includes
a control unit that controls the drive unit.

4. The separator suction device according to claim 1, wherein the first suction portion and the second suction portion suction inner portions inwardly separated from an outer periphery of the separator by a predetermined distance.

* * * * *